United States Patent
Khayat et al.

(10) Patent No.: US 12,549,581 B2
(45) Date of Patent: Feb. 10, 2026

(54) DYNAMIC RECONSTRUCTION OF CLOUD APPLICATION TRAFFIC FOR SECURITY MONITORING

(71) Applicant: Vorlon, Inc., Mountain View, CA (US)

(72) Inventors: Amir Khayat, Mountain View, CA (US); Amichay Spivak, Tel-Aviv (IL); Daniel Ischak Tylman, Modiin (IL)

(73) Assignee: Vorlon, Inc., Mountain View, CA (US)

( * ) Notice: Subject to any disclaimer, the term of this patent is extended or adjusted under 35 U.S.C. 154(b) by 63 days.

(21) Appl. No.: 18/679,355

(22) Filed: May 30, 2024

(65) Prior Publication Data

US 2024/0406201 A1 Dec. 5, 2024

Related U.S. Application Data

(60) Provisional application No. 63/470,440, filed on Jun. 1, 2023.

(51) Int. Cl.
*H04L 9/40* (2022.01)
*G06F 9/54* (2006.01)

(52) U.S. Cl.
CPC .......... *H04L 63/1425* (2013.01); *G06F 9/547* (2013.01)

(58) Field of Classification Search
CPC .. H04L 63/1425; H04L 63/1433; G06F 9/547
USPC .......................................................... 726/23
See application file for complete search history.

(56) References Cited

U.S. PATENT DOCUMENTS

| | | | | |
|---|---|---|---|---|
| 12,126,644 | B2 * | 10/2024 | Seetharamaiah | ... H04L 63/1425 |
| 2022/0342690 | A1 * | 10/2022 | Shua | ...................... G06F 11/301 |
| 2024/0134979 | A1 * | 4/2024 | Kravtsov | ............... G06F 21/577 |

FOREIGN PATENT DOCUMENTS

KR 20250125479 A * 8/2025 ............. H04L 67/50

* cited by examiner

*Primary Examiner* — Aubrey H Wyszynski
(74) *Attorney, Agent, or Firm* — Fenwick & West LLP

(57) ABSTRACT

A system and a method are disclosed for dynamic reconstruction of cloud traffic for security monitoring. A catalog is maintained that includes application programming interface (API) data associated with one or more APIs of cloud applications. One or more collectors, that are each specific to a different API of the one or more APIs, collect network information describing communications associated with the one or more cloud applications used by devices of an organization, the network information including partial log data from some of the one or more collectors. A reconstruction of API network traffic is generated using at least the partial log data and the catalog. Security information is determined that identifies a security risk using the reconstruction of the API network traffic. The security information is provided to an administrator device of the organization.

20 Claims, 8 Drawing Sheets

500

```
┌─────────────────────────────────────────────────────────┐
│ Maintain a catalog that includes API data associated    │
│ with one or more APIs of one or more cloud applications │
│                          510                            │
└─────────────────────────────────────────────────────────┘
                            │
                            ▼
┌─────────────────────────────────────────────────────────┐
│ Collect, using one or more collectors that are each     │
│ specific to a different API of the one or more APIs,    │
│ network information                                     │
│                          520                            │
└─────────────────────────────────────────────────────────┘
                            │
                            ▼
┌─────────────────────────────────────────────────────────┐
│ Generate an enriched reconstruction of API network      │
│ traffic using at least some partial log data of the     │
│ network information and the catalog                     │
│                          530                            │
└─────────────────────────────────────────────────────────┘
                            │
                            ▼
┌─────────────────────────────────────────────────────────┐
│ Determine security information that identifies a        │
│ security risk using the enriched reconstruction of the  │
│ API network traffic                                     │
│                          540                            │
└─────────────────────────────────────────────────────────┘
                            │
                            ▼
┌─────────────────────────────────────────────────────────┐
│ Provide the security information to an administrator    │
│ device of an organization                               │
│                          550                            │
└─────────────────────────────────────────────────────────┘
```

FIG. 5

DYNAMIC RECONSTRUCTION OF CLOUD APPLICATION TRAFFIC FOR SECURITY MONITORING

CROSS REFERENCE TO RELATED APPLICATIONS

This application claims the benefit of, and priority to, U.S. Provisional Application No. 63/470,440, filed Jun. 1, 2023, which is incorporated by reference in its entirety.

TECHNICAL FIELD

The disclosure generally relates to the field of cybersecurity, and more specifically to dynamic reconstruction of cloud application traffic for security monitoring.

BACKGROUND

In recent years, the widespread adoption of cloud-based services has led to an increase in the use of application programming interfaces (APIs) to enable inter-connectivity between different systems. However, this increased usage also increases the complexity of API security, particularly when it comes to detecting and responding to attacks. In order to monitor and prevent malicious activity, different applications provide different means for analyzing the activity, this may include audit logs and other methods, usually API based tools. However, these methods provide partial information and are distributed across multiple systems, making it difficult to reconstruct the complete context of each API call. This makes it challenging to perform effective analysis and detect security threats. Due to the inherent complexity of distributed systems, existing solutions for cloud-based security often rely on static analysis, are too specific for each application, and cannot provide a 'real-time' visibility that combines both the security context and the actual API usage.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 5 is a flowchart for a method of dynamic reconstruction of cloud application network traffic for security monitoring, in accordance with some embodiments.

DETAILED DESCRIPTION

Figure 1:
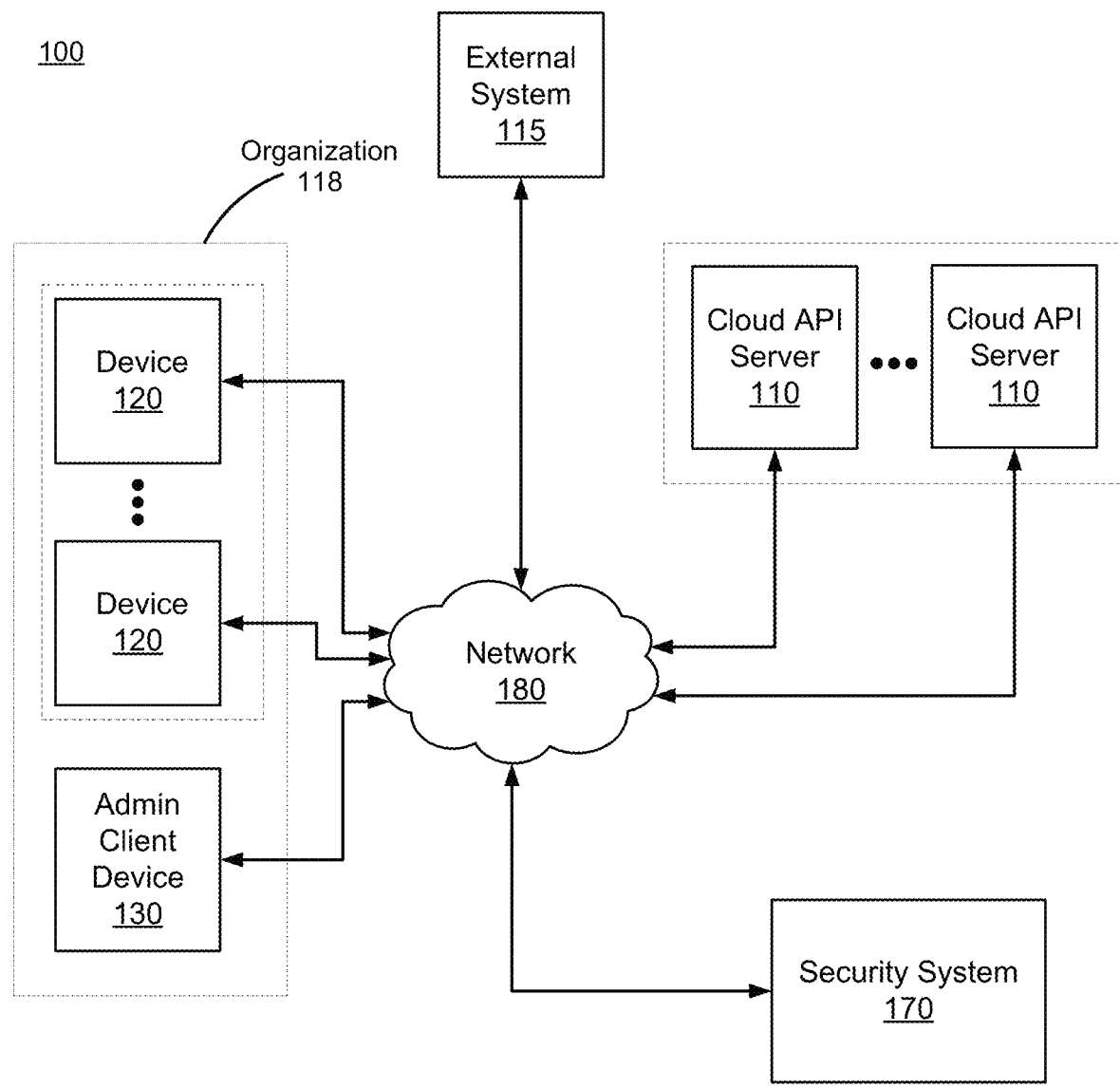
FIG. 1 illustrates an example networked computer environment, in accordance with one or more embodiments.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method and computer readable storage medium for dynamic reconstruction of cloud traffic for security monitoring. The system uses various components and dynamic algorithms to efficiently combine and analyze partial log data generated by distributed cloud applications creating a result set of traffic data that includes meta-data and security context. The system may use the reconstructed traffic data for a variety of purposes including, e.g., detecting security threats, auditing compliance with regulatory requirements, understanding organization data flows and comparing different applications-security-wise.

In some aspects, the techniques described herein relate to a method, performed at a security system including one or more processors and a non-transitory computer readable medium. A process includes maintaining a catalog that includes application programming interface (API) data associated with one or more APIs of one or more cloud applications. The one or more APIs are used by one or more devices of an organization to access information from one or more cloud API servers. The process collects, using one or more collectors that are each specific to a different API of the one or more APIs, network information describing communications associated with the one or more cloud applications used by the one or more devices of the organization and the one or more cloud API servers. The network information includes partial log data from some of the one or more collectors. The process generates an enriched reconstruction of API network traffic using at least the partial log data and the catalog. The process determines security information that identifies a security risk using the enriched reconstruction of the API network traffic. The process provides the security information to an administrator device of the organization.

In some aspects, the techniques described herein relate to a non-transitory computer readable storage medium configured to store instructions thereon. The instructions when executed by a security system, which includes one or more processors (and/or controllers) and a memory, cause the security system to maintain a catalog that includes API data associated with one or more APIs of one or more cloud applications. The one or more APIs are used by one or more devices of an organization to access information from one or more cloud API servers. The security system collects, using one or more collectors that are each specific to a different API of the one or more APIs, network information describing communications associated with the one or more cloud applications used by the one or more devices of the organization and the one or more cloud API servers. The network information includes partial log data from some of the one or more collectors. The security system generates an enriched reconstruction of API network traffic using at least the partial log data and the catalog. The security system determines security information that identifies a security risk using the enriched reconstruction of API network traffic; and provide the security information to an administrator device of the organization.

In some aspects, the techniques described herein relate to a security system including: one or more processors and a non-transitory computer readable storage medium communicatively coupled with the processor (e.g., via a computer bus). The non-transitory computer readable storage medium ("CRM") is configured to store instructions that, when executed by the processor, cause the security system to maintain a catalog that includes API data associated with one or more APIs of one or more cloud applications. The one or more APIs are used by one or more devices of an organization to access information from one or more cloud API servers. The CRM includes instructions to collect, using one or more collectors that are each specific to a different API of the one or more APIs. The network information describes communications associated with the one or more cloud applications used by the one or more devices of the organization and the one or more cloud API servers. The network information includes partial log data from some of the one or more collectors. The CRM includes instructions to generate an enriched reconstruction of API network traffic using at least the partial log data and the catalog. The CRM also may include instructions to determine security information that identifies a security risk using the enriched reconstruction of API network traffic. The CRM includes instructions to provide the security information to an administrator device of the organization.

Example Networked Computer Environment

FIG. 1 illustrates an example networked computer environment 100, in accordance with one or more example embodiments. The example environment 100 illustrated in FIG. 1 includes cloud API servers 110, external system 115, devices 120, an administration (admin) client device 130, and a security system 170, that are coupled together via a network 180. The devices 120 and the admin client device 130 may be part of an organization 118. Alternative embodiments may include more, fewer, or different components from those illustrated in FIG. 1, and the functionality of each component may be divided between the components differently from the description below. As such, there may be more than one organization 118 and/or external system 115. Additionally, each component may perform their respective functionalities in response to a request from a human, or automatically without human intervention. Further the components of FIG. 1 may be computing systems and the computing systems may include some or all of the components further described with FIG. 6.

The cloud API servers 110 provide various third-party services that may be used by cloud applications operating on devices (e.g., some or all of the devices 120, the external system 115, the admin client device 130) on the network 180 via APIs. A cloud application is software of which at least some of is on one or more of the cloud API servers 110 that a networked device (e.g., endpoint device or endpoint) may access using an API. In some embodiments a cloud application may be a third-party application. A third-party application refers to a software application developed by an independent entity, not by the original manufacturer of the device or the primary operating system of the device. Cloud applications may be useful to a device to, e.g., enhance or complement existing functionalities. Cloud applications may include, e.g., communication and collaboration tools, human resources management platforms and tools, customer relationship management software, productivity and office tools, project management apps, financial and accounting software, marketing and analytics tools, etc. Some of these third party applications may operate on and/or use sensitive information associated with users of the organization. Sensitive information is information that generally kept confidential. Sensitive information may include, e.g., personally identifiable information (PII), passwords, phone numbers, carrier details, location data, message type, some other information that is generally kept confidential, or some combination thereof.

The external system 115 is composed of one or more devices that are external to the organization 118. The external system 115 may be, e.g., a device attempting to gain illegal and/or unauthorized access to the organization 118. The external system 115 can be, e.g., a server, a personal or mobile computing device (e.g., a smartphone, a tablet, a laptop computer, or desktop computer), a cloud API server, or some combination thereof. In some embodiments, the external system 115 executes a cloud application (may be a third party application) that uses one or more APIs to communicate with one or more of the cloud API servers 110.

The organization 118 is a collection of one or more devices that use one or more cloud applications that interact with the cloud API servers 110 via APIs. The organization 118 may be, e.g., a business. The organization 118 includes the devices 120, and the admin client device 130. Note in some embodiments, there is only a single device 120. In some embodiments, there may not be an admin client device 130, and the functionality of the admin client device 130 is performed by a device 120.

The devices 120 are network-enabled electronic devices that are coupled to the network 180 and include one or more cloud applications. The cloud applications (may be third party applications) use APIs to communicate with some or all of the cloud API servers 110. The device 120 may be, e.g., a server, a personal or mobile computing device (e.g., a smartphone, a tablet, a laptop computer, or desktop computer), some other device that can use an API to communicate with a cloud API server 110, etc.

The admin client device 130 may be used by an administrator to interact with the security system 170. The admin client device 130 may be, e.g., a personal or mobile computing device. In some embodiments, the admin client device 130 is one of the devices 120. Likewise, in some embodiments, there may be multiple admin client devices in the organization 118. The admin client device 130 may enable access to a security interface described herein (e.g., via an installed application or via a web browser) for viewing security information about cloud applications, configuring security settings, performing other administrative tasks, etc. In some embodiments, the security interface may present a listing of different cloud applications. The administrator may select one or more of the different cloud applications for monitoring by the security system 170. The administrator may also provide the security system 170, via the security interface, one or more API access tokens for each of the selected cloud applications. The security interface may present security information (e.g., cloud application landscape, risk scores for cloud applications, etc.) associated with the organization 118. In some embodiments, the security interface may receive alerts (e.g., exposure of sensitive data by a cloud application) from the security system 170. The security interface may enable an administrator to execute various remedial actions responsive to the alert.

The security system 170 is configured to dynamically reconstruct API network traffic associated with cloud applications for security monitoring. The security system 170 may use various components and dynamic algorithms to efficiently combine and analyze partial log data generated by distributed cloud applications to determine security information for one or more organizations (e.g., the organization 118). In some embodiments, the security system 170 determines security information based on a selection of APIs for monitoring from an admin client device of an organization. Security information (e.g., risk factors and/or risk scores associated with cloud application(s), a cloud application landscape, reconstructed API network traffic, etc.) is information associated with network traffic associated with cloud applications that is useful for security monitoring. The security system 170 may use the security information (e.g., reconstructed network traffic associated with cloud applications) for a variety of purposes, including detecting security threats, auditing compliance with regulatory requirements, generating organization data flows and comparing different applications-security-wise.

In some embodiments, the security system 170 receives from the admin client device 130 (e.g., via the security interface) a request for security information for the organization 118. Responsive to the request, the security system 170 may provide the security information associated with the organization 118 to the admin client device 130. In some embodiments, the security system 170 may push alerts to an admin client device of an organization if one or more conditions (e.g., exposure of sensitive information) are met. In some embodiments, an alert may also include a recommended mitigation for a cause of the alert. The security system 170 is described in detail below with regard to FIG. 2.

The cloud API servers 110, the external system 115, the devices 120, the admin client device 130, and the security system 170 can communicate with each other via the network 180. The network 180 is a collection of computing devices that communicate via wired or wireless connections. The network 180 may include one or more local area networks (LANs) or one or more wide area networks (WANs). The network 180, as referred to herein, is an inclusive term that may refer to any or all of standard layers used to describe a physical or virtual network, such as the physical layer, the data link layer, the network layer, the transport layer, the session layer, the presentation layer, and the application layer. The network 180 may include physical media for communicating data from one computing device to another computing device, such as multi-protocol label switching (MPLS) lines, fiber optic cables, cellular connections (e.g., 3G, 4G, or 5G spectra), or satellites. The network 180 also may use networking protocols, such as transmission control protocol/internet protocol (TCP/IP), hypertext transfer protocol (HTTP), secure shell protocol (SSH), short message/messaging service (SMS), or file transfer protocol (FTP), to transmit data between computing devices. In some embodiments, the network 180 may include Bluetooth or near-field communication (NFC) technologies or protocols for local communications between computing devices. The network 180 may transmit encrypted or unencrypted data.

Note that existing solutions for cloud-based security often rely on static analysis, are too specific for each application, and cannot provide a 'real-time' visibility that combines both the security context and the actual API usage. Accordingly, conventional systems are generally not able to reconstruct cloud API traffic from distributed logs in a scalable and efficient manner. In contrast, the security system 170 described herein can reconstruct cloud API traffic efficiently and in a scalable manner. As such, the security system 170 is a powerful and scalable tool for enhancing API security and improving the reliability and performance of cloud-based services.

Security System

Figure 2:
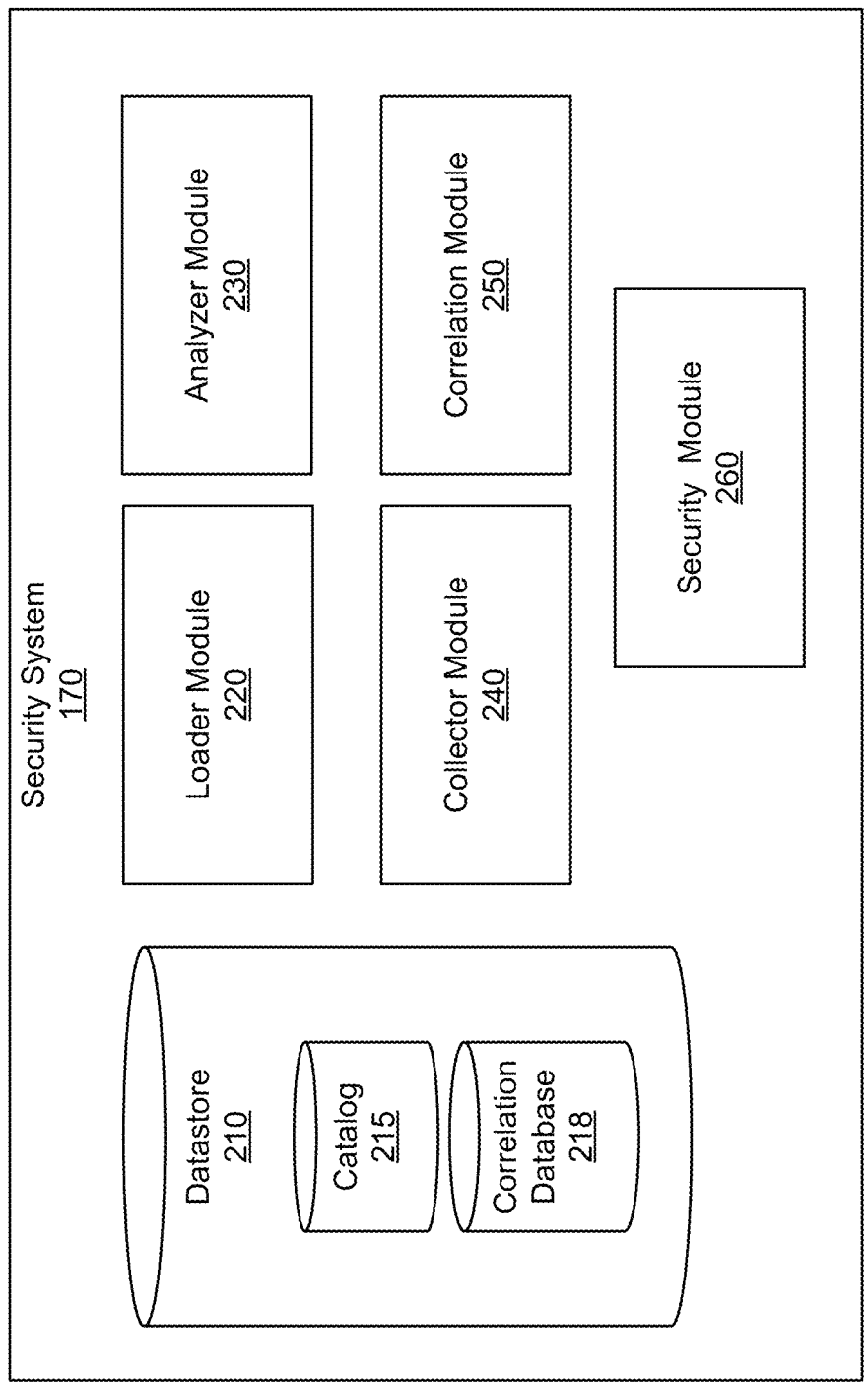
FIG. 2 illustrates an example system architecture for a security system, in accordance with one or more embodiments.

FIG. 2 illustrates an example system architecture for the security system 170, in accordance with one or more embodiments. The system architecture illustrated in FIG. 2 includes a datastore 210, a loader module 220, an analyzer module 230, a collector module 240, a correlation module 250, and a security module 260. Alternative embodiments may include more, fewer, or different components from those illustrated in FIG. 2, and the functionality of each component may be divided between the components differently from the description below. Further, the modules may be structured as software comprised on program code (instructions) to operate with the functionality disclosed by execution of a processor system that is configured to operate in that specific matter. The processor system may include some or all of the components described in FIG. 6.

The datastore 210 stores data used by the security system 170. The datastore 210 may store data for one or more different organizations. The datastore 210 may store security information, selections of cloud computing applications for monitoring, security configurations, etc. The datastore 210 also stores a catalog 215 and a correlation database 218. In other embodiments, the catalog 215 and/or the correlation database 218 may be separate from the datastore 210. The datastore 210 may also store trained machine learning models used by the security system 170. For example, the datastore 210 may store the set of parameters for a trained machine learning model on one or more non-transitory, computer-readable media. The datastore 210 uses computer-readable media to store data, and may use databases to organize the stored data.

The catalog 215 is a database designed to hold API data for each supported cloud application. An example structure of a catalog is further discussed below with regard to FIG. 4. API data is structured data associated with one or more cloud applications. The API data may include information describing services, endpoints, exposures, risk scores, information from API documentation, or some combination thereof. The catalog 215 may be queried by other modules in the security system 170 to provide comprehensive, but static, security information & documentation for the APIs that it stores.

A service is representative of a single cloud application API (e.g., GOOGLE Photos API). A service may be identified by an ID and contain information about its risk score, compliance, and exposures. Exposures are containers that hold data about potential security risks in a cloud application. For example, exposures may include, e.g., a name, a family, a severity, and a priority. Each API routine is known as an "endpoint" and each endpoint may be linked to one or more "exposures." An endpoint may include a method, a version, a path, and information about its responses and exposures.

The catalog 215 may be structured in a consistent manner. For example, services may be linked to multiple endpoints, where each endpoint can have zero or multiple exposures and zero or multiple responses. The responses encompass possible responses (in some cases all possible responses) from an API call, along with the potential data it can offer.

The catalog 215 may represent each cloud application by a service entry, such as the GOOGLE Maps API. This service entry is associated with a group of endpoint records, with each endpoint representing an API exposed by the service. For example, the "GET https://maps.googleapis.com/maps/api/place/photo?parameters" API call may be represented by one endpoint entry in the catalog 215. The endpoint entry may include information such as potential exposures associated with the API call, all possible responses (e.g., status code 404, status code 200), and their potential headers, bodies, and exposures.

The correlation database 218 is a datastore designed to hold enriched connections that form a reconstruction of traffic associated with the cloud applications on a network. Note that the enriched connections also include security related information (e.g., endpoint risk score and exposure(s) taken from the catalog 215) in addition to information describing network traffic. The correlation database 218 may be updated and/or queried by other modules in the security system 170 (e.g., the security module 260).

The loader module 220 and the analyzer module 230 maintain the catalog 215. The loader module 220 may be configured to retrieve API documentation for some or all of the APIs associated with one or more cloud applications. The loader module 220 may retrieve the API documentation for the one or more cloud applications from public sources. In some embodiments, the loader module 220 may retrieve the API documentation for a cloud application from a cloud API server 110 associated with the cloud application.

The loader module 220 may be configured to load some or all of the API documentation as API data for one or more cloud applications into the catalog 215. Note that API data associated with a cloud application may include data for one or more APIs used by the cloud application. The loader module 220 uses one or more loaders to load some or all of the API documentation as API data into the catalog 215. API data is data from the API documentation that has been converted into a data structure used by the catalog 215. The API documentation specifies API definition source items (allows calling applications to utilize the cloud application). The one or more loaders automate the process of converting API definition source items from the API documentation into API data, and uploading the API data to the catalog 215. The one or more loaders may use different methods to extract the API definition source items, including parsing online documentation, scanning websites, using pre-defined files, accessing provided APIs with bots, reverse-engineering software developer kits, etc.

While there are standards and semi-standards like Open API and Postman, not all cloud applications use the same format for API definition source items. For example, some applications expose non-standard APIs, which may be documented in an awkward manner. Accordingly, the loader module 220 may include a plurality of loaders, one for each format of API definition source items. A loader associated with a specific format of API definition source items may be used for cloud applications that use that specific format of API definition source items. For example, there may be a first loader used for Open API, a second loader used for Postman, etc. The loaders convert the API definition source items to fit within the data structure (e.g., services, endpoints, exposures) used in the catalog 215, and then upload converted data to the catalog 215.

The analyzer module 230 may be configured to extract exposure information for each of the one or more APIs. The analyzer module 230 may extract the exposure information from the API documentation and/or from sample test instances of the cloud application using one or more analyzers. In some embodiments, there is a plurality of analyzers, one specific to each cloud application. Exposure information is information describing one or more exposures. An exposure is sensitive information that is used by the API of the cloud application.

The analyzer module 230 may extract exposure information from the API data. An analyzer corresponding to a particular cloud application may scan the API data associated with the cloud application for exposures. For example, a scan may identify PII that is stated in the API data, derived from the response description (fields names like "username" or "home address"), provided in API documentation samples, etc. The analyzer updates the catalog 215 with the extracted exposure information. In some embodiments, once the analyzer has identified an exposure, it associates the endpoint with that exposure and updates the catalog 215 accordingly. Note that, for other APIs, different analyzers may be used in a similar manner to extract exposure information and update the catalog 215 accordingly.

The analyzer module 230 may extract the exposure information from sample test instances of cloud applications using one or more analyzers. For example, an analyzer corresponding to a particular cloud application may establish a sample test instance of the cloud application. The analyzer may dynamically call the API associated with the cloud application within the sample test instance. The analyzer may call each API provided in the API documentation for the cloud application. The analyzer may read the response(s), and identify exposures. For example, the analyzer may scan the headers & query parameters, and may focus on the body of the result to find sensitive information such as PII in a response. The analyzer may use various techniques to identify the exposures. For example, the analyzer may use pattern matching, string comparison, regular expressions, text summarizations, syntax & lexical analysis and other static text analysis methods. The analyzer may also leverage machine learning methods, such as: named entity recognition, topic modeling, text classification and others. Once an analyzer has identified an exposure, it associates the endpoint with that exposure.

The analyzer module 230 may calculate a risk score for the cloud application based on identified exposures (by the one or more analyzers). Different exposures may be associated with different levels of risk. For example, a social security number of a user may have a higher level of risk than a public telephone number of the user. In another example, if the API data indicates a particular exposure—but responsive to an API call for a sample test instance a different exposure occurs, the associated level of risk may depend on what is actually exposed. The risk may be computed in an additive way, e.g., a lower score may be a better score. A service risk score calculation may be based on the endpoints it exposes. Each endpoint exposed by the service is examined, for example, for: (a) "authentication": the better the authentication, the lower the risk; (b) "privileges": APIs that exposes privileges management are more risky (for instance, APIs that generate tokens); (c) "restrictions": API that has restrictions are less risky; (for instance, APIs that restrict the number of calls); (d) "certification": API that complies to security standards are less risky;

and (e) "sensitive data": API that exposes sensitive data are more risky. The analyzer module 230 may update the catalog 215 with associations between endpoints and exposures, and the calculated risk score.

The collector module 240 may collect network information for cloud applications used by the organization. Network information describes communications associated with the one or more cloud applications of the organization. Network information may include, e.g., information describing communications between some combination of, one or more of the cloud API servers 110, one or more of the devices 120, the admin client device 130, and the external system 115. For example, the network information may include traffic information, audit logs, security keys, user information, any other data relevant to security, or some combination thereof.

The collector module 240 collects the network information using one or more collectors. The collector module 240 regularly collects the network information using the one or more collectors. For example, the collector module 240 may periodically (e.g., hourly, or some other time frame) collects the network information using one or more collectors. The one or more collectors may be of different types. For example, a collector may be a standalone collector that uses HTTP-based clients to connect to remote applications and retrieve information via APIs of cloud applications. In another example, a collector is a module that is installed as an extension within a cloud application. In another example, a collector is a man-in-the-middle collector that redirects traffic between two cloud applications. In another example, a collector is a third-party aggregator that has access to traffic from other applications and can push the network traffic information to the correlation module 250.

In some embodiments, the traffic information may include partial log data (e.g., traffic log data) from each of the one or more collectors. In this manner, the traffic information may include an HTTP request and response, but could also just include the request or just the response. A collector may determine the service endpoint that was called by auditing the log. Even if only the response is logged, the collector may also conclude the details about the request, such as the user agent or caller IP address. Other relevant data also may be collected as well depending on the specific cloud application.

In some embodiments, there is a plurality of collectors, one specific to each cloud application. Each collector may run against a specific application instance (real world data, not a sample test instance). In some embodiments, the collectors may use API access token(s) to establish some or all of the application instances. An application instance is the service boundary that holds information for a particular cloud application. In some instances, the collectors may see a portion of the network traffic, as cloud applications often audit only a small part of the traffic they process. As such, a single collector may provide partial information about API calls.

The collector module 240 provides the collected network information to the correlation module 250 and/or the datastore 210. In some embodiments, the collector module 240 may provide the collected network information to the correlation module 250 and/or the datastore 210 once collected (e.g., matches period in which the network data is collected). In other embodiments, the collector module 240 provides the collected network information to the correlation module 250 and/or the datastore 210 at some other schedule (e.g., after two instances of network data collection has passed).

The correlation module 250 may reconstruct API network traffic for an organization using the network information and the catalog 215. To reconstruct the API network traffic, the correlation module 250 may organize the requests and responses from the network information (e.g., partial log data) into corresponding tables. The correlation module 250 may identify potential matches between the requests and responses to create pairs (a request and a corresponding response) that describe complete HTTP round trips (which represent API calls), and together form the reconstructed API network traffic.

The correlation module 250 may use various approaches to determine that traffic belongs to a same HTTP communication round trip. For example, the correlation module 250 may check if both a request and a response were collected by a same collector, and if they were they belong to the same HTTP communication round trip. In another approach, the correlation module 250 may determine that a request and a response are part of the same HTTP communication round trip if they were issued approximately at the same time and share a same URL path and similar processing. Because many protocols, and HTTP in particular, enforce responses that must follow requests within a reasonable timeout, it is possible to have a heuristic so that a seen response may be associated with a given request. In another approach, the correlation module 250 may determine that a request and a response are part of the same HTTP communication round trip if both the request and the response were issued at a same time and a responder hostname matches a request hostname.

In another approach, the correlation module 250 may determine that a request and a response are part of the same HTTP communication round trip if both the request and the response were issued at a same time and a responder hostname matches a request hostname. In another approach, the correlation module 250 may look for unique transaction IDs in headers and/or bodies. In another approach, the correlation module 250 may analyze the payload of the data. For example, if a response contains data that is related to a request, such as a response to a search query, it is likely that they are part of the same round trip. The one or more of the above approaches can be applied even if some of the fields in a request or a response are missing, allowing for greater flexibility in matching traffic. Note that the pairs are typically collected by different collectors associated with different APIs of one or more cloud applications, and it is the combination of the traffic uploads from multiple collectors that provides enough data for the correlation module 250 to reconstruct these pairs.

Note that the pairs that have been created at this stage typically lack security-related information. As such, once the correlation module 250 has identified pairs of requests and responses belonging to a same round trip, they may be enriched with additional information to form connection entries. The connection entries describe an enriched reconstruction of API network traffic. Enrichment includes associating the pair with an endpoint entry in the catalog 215. The correlation module 250 may query the catalog 215 for matching endpoints based on one or more fields in the catalog 215. In some embodiments, to match endpoints, the correlation module 250 may use a set of criteria such as service IDs, HTTP methods, uniform resource identifier (URI) and query parameters. The correlation module 250 compares these criteria with the network information to find the corresponding endpoint in the catalog 215. For example, the network information from the collectors may include an HTTP response code and URI path, and the correlation module 250 may query the catalog 215 for matching endpoints using the URI path.

After identifying the catalog endpoint that matches the URI path of an HTTP round trip, the correlation module 250 may associate the endpoint with the round trip to form a connection entry. This enables the correlation module 250 to complete the missing details from the catalog 215 such as the HTTP method, headers, body, and any other information that was not captured in the collected network traffic. And using catalog association, connection entries may be enriched with the other information that was stored in the catalog 215 for each endpoint. This may include details about the exposures and risks for each endpoint.

The correlation module 250 may also enrich connection entries using information from other sources. For example, a geo-location enricher may be used to add geo-location information for IP address. In some embodiments, the correlation module 250 may enrich a connection entry based on performing a callback to a service to retrieve or construct a request for a full body. In some embodiments, the correlation module 250 may enrich a connection entry based on IP address reputation to determine the reputation of a random caller. In some embodiments, the correlation module 250 may enrich a connection entry based on user agent analysis to determine the type of device or browser used for the request. In some embodiments, the correlation module 250 may enrich a connection entry based on integration with identity and access management systems to associate requests with specific users or roles. In some embodiments, the correlation module 250 may enrich a connection entry based on integration with one or more machine learning models to detect anomalies or patterns of suspicious behavior. In some embodiments, the correlation module 250 may enrich a connection entry based on integration with one or more third-party data sources to provide contextual information (e.g., weather conditions, or stock prices).

The correlation module 250 saves the enriched reconstructed API network traffic (i.e., the enriched connection entries) to the correlation database 218. The enriched reconstructed API network traffic not only describes network traffic associated with the cloud applications on the network, but also includes security related information (e.g., risk score(s), exposure(s), etc.).

The security module 260 may determine security information using the enriched reconstructed API traffic. The security information describes security related content for cloud applications of an organization. The security information may detail one or more security risks associated with the cloud application(s) associated with the organization. The security information may include, e.g., risk factors and/or risk scores associated with cloud application(s), a cloud application landscape, reconstructed API network traffic, security settings for cloud application(s), some other security related content for cloud applications, or some combination thereof. The security module 260 may retrieve some or all of the enriched reconstructed API traffic from the correlation database 218.

The enriched reconstructed API network traffic enables the system to alert a security administrative function or operation (e.g., security personnel or security monitoring software) of data leakage and other security issues related to third party applications. The security module 260 may identify one or more security risks using the enriched reconstructed API traffic. For example, the security module 260 may use the security related information (e.g., risk score and exposure) along with network information (e.g., traffic information) to calculate a risk factor that is specific to each connection entry. The risk factor may describe a level of risk (e.g., low risk, medium risk, high risk, etc.). The security module 260 may adjust the risk factor based in part on other factors (e.g., client reputation, sensitivity of the information) associated with a pair.

In some embodiments, the security module 260 may generate a cloud application landscape for an organization using the enriched reconstructed API network traffic. The cloud application landscape is a visualization showing how cloud applications used by the organization are connected to each other, and may also show connections to external systems (e.g., the external system 115). The security module 260 may use the enriched reconstruction of the API network traffic to generate the cloud application landscape. In this manner, the security module 260 may identify one or more external systems that were part of the communication pathway for a cloud application, but are not part of the organization. The security module 260 may generate alerts and/or flag the one or more external systems.

The security module 260 may provide the security information to an admin client device 130 of the organization 118. The security information describes any identified security risks. A security interface of an admin client device of the organization may present the security information to an administrator. The administrator may take action based on security risks presented. In some embodiments, the security module 260 may also generate recommended courses of action to mitigate a security risk, and provide it to the admin client device as part of the security information and/or an alert.

The security module 260 may provide an alert to an administrator device based in part on the identified security risk. For example, if the security risk is above a threshold level and/or of a particular type, the security module 260 may push the alert to a device associated with the administrator. In some embodiments, the alert may also include a recommended course of action to mitigate the security risk.

Figure 3A:
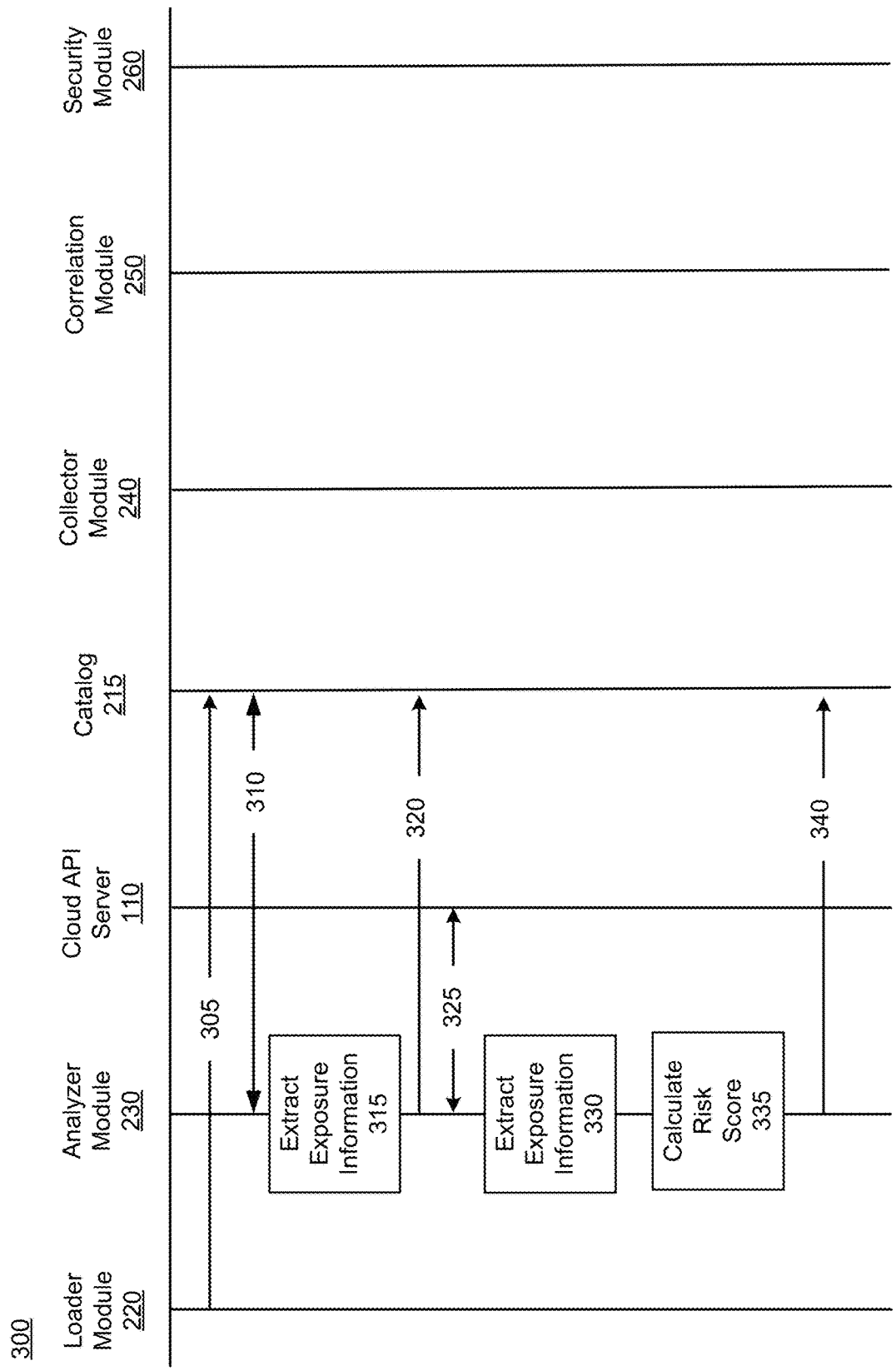
FIGS. 3A-B illustrates an example sequence diagram describing dynamic reconstruction of cloud application traffic for security monitoring, in accordance with some embodiments.
Figure 3B:
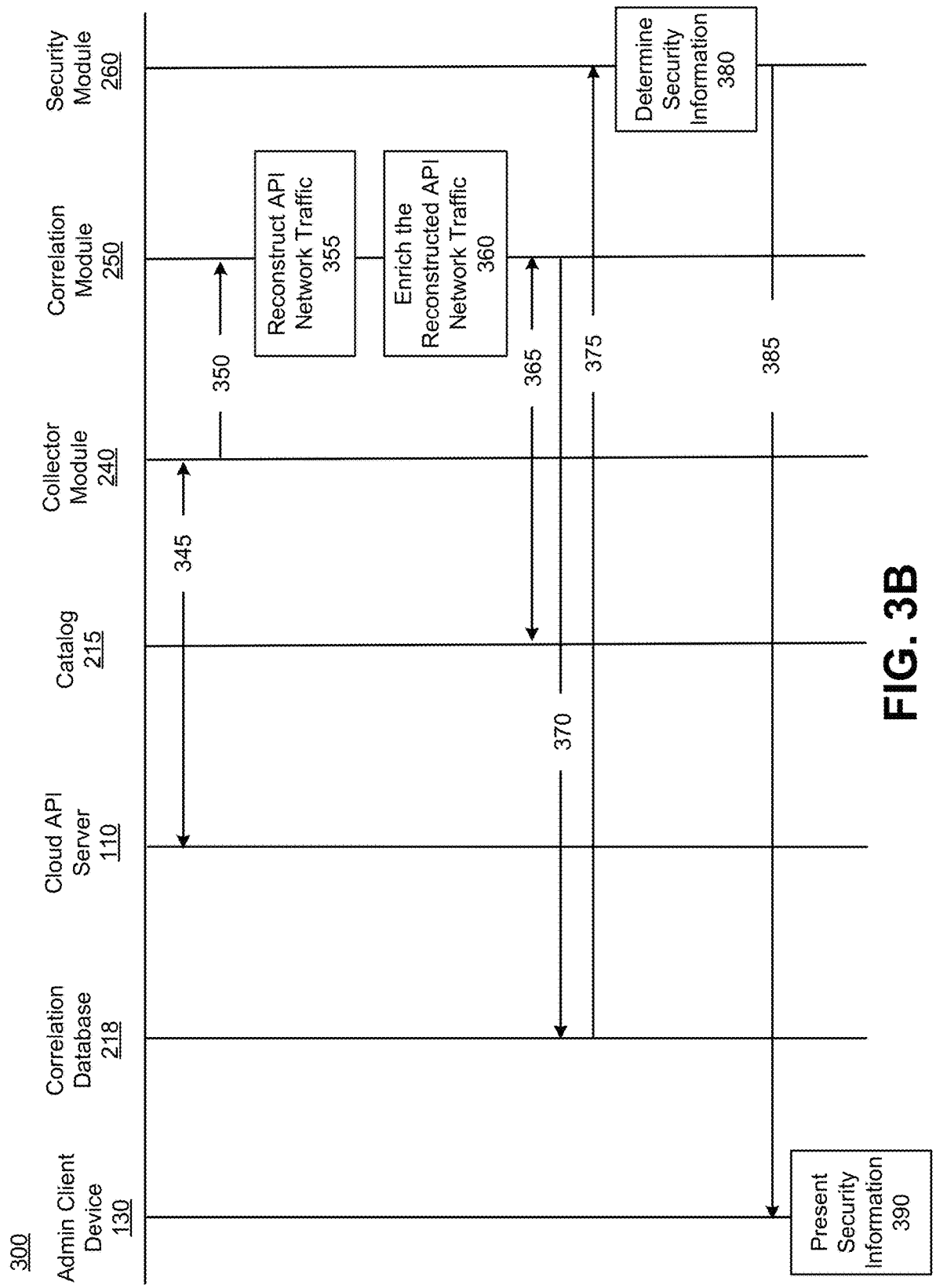

FIGS. 3A and 3B describe an example sequence diagram 300 describing dynamic reconstruction of cloud application traffic for security monitoring, in accordance with some embodiments. Alternative embodiments may include more, fewer, or different interactions from those illustrated in FIGS. 3A-B, and the steps may be performed in a different order from that illustrated in FIGS. 3A-B. The sequence diagram 300 may be associated with security monitoring for the organization 118. An administrator of the admin client device 130 may want to monitor security of a cloud application used by the organization 118. Note that while the sequence diagram 300 is in the context of monitoring single cloud application, it may be applied to multiple cloud applications used by the organization 118.

The loader module 220 loads 305 API data generated using API documentation of an API of a cloud application into the catalog 215. The API documentation may have been retrieved from, e.g., a cloud API server 110 and/or some other source. The loader module 220 uses a loader to load some or all of the API documentation into the catalog 215 as API data. In some embodiments, the loader is specific to the API, such that each API has a different loader. The loader may covert API definition source items from the API documentation to fit within the data structure (e.g., services, endpoints, exposures) used in the catalog 215, and then upload the converted data (e.g., API data) to the catalog 215.

The analyzer module 230 retrieves 310 the API data from the catalog 215. The analyzer module 230 extracts 315 exposure information from the API data. For example, the analyzer module 230 may select an analyzer, from a plurality of analyzers that are each specific to different APIs, that is specific to an API used by the cloud application. If the cloud application uses multiple APIs, the analyzer module 230 may select a different analyzer for each of the multiple APIs. The selected analyzer(s) scan the API data for exposure information (e.g., personally identifiable information (PII)). The analyzer module 230 then uploads 320 the exposure information to the catalog 215.

The analyzer module 230 establishes 325 a sample test instance for some or all of the APIs of the cloud application. For example, the analyzer(s) corresponding to the API(s) of the cloud application may establish sample test instances of the cloud application. The analyzer(s) may dynamically call the API(s) associated with the cloud application within the sample test instances.

The analyzer module 230 extracts 330 exposure information from responses that are received. For example, the analyzer(s) may scan the headers & query parameters, and may focus on the body of the response to identify exposure information.

The analyzer module 230 calculates 335 a risk score associated with the cloud application. The analyzer module 230 may calculate a risk score for each endpoint of the cloud application based on the exposure information determined at steps 315 and 330. The analyzer module 230 updates 340 the catalog 215 with the exposure information extracted at step 330 and the calculated risk score(s).

By way of example, in one embodiment, a service risk score may be calculated based on the endpoints it exposes. Each endpoint exposed by the service may be examined for one or more of (a) "authentication": the better the authentication, the lower the risk; (b) "privileges": APIs that exposes privileges management are more risky (for instance, APIs that generate tokens); (c) "restrictions": API that has restrictions are less risky; (for instance, APIs that restrict the number of calls); (d) "certification": API that complies to security standards are less risky; and (e) "sensitive data'": API that exposes sensitive data are more risky. Using a 0 to 100 scale, the risk may be computed in an additive way such that a lower score may be considered better. For example, for a service A, it has 3 endpoints, one of which is exposing personal identifiable information (PII) (+20 score in this example), and the other exposes a token (+33). It also supports IP bases restrictions (−30), and it is SOC-2 compliance (−9). It supports OAUTHv2 authentication (30), and has API Secret Monitoring (−10). Accordingly, in this example, a risk score for service A would be 34, which may be considered relatively low for this example.

The collector module 240 collects 345 network information describing communications of cloud applications being used by the organization. The collector module 240 may use one or more collectors that are specific to the cloud application. The collector module 240 may establish a separate application instance for each collector to collect network information. To establish an application instance, the collector module 240 may use, e.g., API access tokens (e.g., provided by the administrator). The collector module 240 collects the network information using one or more collectors. In some embodiments, the collector module 240 periodically collects the network information using one or more collectors. The collected network information may include traffic information that includes partial log data (e.g., a request but not the response or vice versa). The collector module 240 updates 350 the correlation module 250 with the network information (and/or the datastore 210). It is noted that the analyzer module 230 is configured to analyze the API so risk can be calculated in a later stage. It is used once, at rest, to enrich the data associated with the API calls. This is beneficial where there is a lack of documentation. The collector module 240 role is to read the service traffic as provided by the service audit logs and other means. It is used periodically or continuously to collect the data that is thereafter used to obtain and evaluate the actual traffic between services.

The correlation module 250 reconstructs 355 API network traffic for the organization using the network information. For example, the correlation module 250 may organize requests and responses from the network information (e.g., partial log data) into corresponding tables. The correlation module 250 may identify potential matches between the requests and responses to create pairs that together form the reconstructed API network traffic. Note that each pair has a request and a corresponding response and describes a complete HTTP round trip.

The correlation module 250 enriches 360 the reconstructed API network traffic to form enriched reconstructed API network traffic. The correlation module 250 may enrich the reconstructed API network traffic by associating 365 each pair with a respective endpoint entry in the catalog 215 to form a corresponding connection entry. For example, the correlation module 250 may query the catalog 215 for matching endpoints based on one or more fields in the catalog 215. The correlation module 250 may use criteria (e.g., service IDs, HTTP methods, etc.) to match with the reconstructed API network traffic to find corresponding endpoints in the catalog 215. The correlation module 250 then associates the endpoints with the corresponding pairs from the catalog 215 to form connection entries. The connection entries make up the enriched reconstructed API network traffic. In this manner, the correlation module 250 can fill in missing details from the catalog 215 such as the HTTP method, headers, body, etc. that were not captured in the collected network information. Note that the association with the pairs in the catalog 215 also acts to enrich the reconstructed API network traffic with other security related information (e.g., exposures and/or risk scores) from the catalog 215. In some embodiments, the correlation module 250 enriches the reconstructed API network traffic using information from other sources (e.g., a geo-location enricher).

The correlation module 250 updates 370 the correlation database 218 with some or all of the enriched reconstructed API network traffic. For example, the correlation module 250 may provide all of the connection entries of the enriched reconstructed API network traffic to the correlation database 218. In another example, the correlation module 250 may identify connection entries, from the determined connection entries, that are not yet in the correlation database 218 and just update the correlation database 218 with the identified connection entries. In some embodiments, the correlation module 250 updates the correlation database 218 immediately after enriching the reconstructed API network traffic. In some embodiments, the correlation module 250 may update the correlation database 218 on a schedule that differs from the schedule used by the collector module 240 to collect network information. For example, the correlation module 250 may update the correlation database 218 after more than one collection cycle of network information has occurred (e.g., one update for every two collection cycles, etc.).

The security module 260 retrieves 375 some or all of the enriched reconstructed API network traffic from the correlation database 218. The security module 260 determines 380 security information (e.g., risk factors, cloud application landscape, etc.) using the enriched reconstructed API network traffic. The security module 260 may identify one or more security risks associated with the one or more cloud applications using the enriched reconstructed API traffic. For example, the security module 260 may use the security related information (e.g., risk score and exposure) along with network information (e.g., traffic information) to calculate a risk factor that is specific to each connection entry. The risk factor may describe a level of risk (e.g., low risk, medium risk, high risk, etc.). The security module 260 may adjust the risk factor based in part on other factors (e.g., client reputation, sensitivity of the information) associated with the corresponding connection entry. In some embodiments, the system may generate a cloud application landscape for the organization using the enriched reconstructed API network traffic.

The security module 260 provides 385 the security information to the admin client device 130. In some embodiments, the security module 260 provides the security information responsive to a request (not shown) from the admin client device 130.

In some embodiments, responsive to a risk factor associated with a security risk exceeding a threshold value, the security module 260 may provide an alert to the admin client device 130 (and/or some other client device associated with the administrator). The alert may include a recommendation for mitigating the security risk.

The admin client device 130 presents 390 the security information. The administrator may take action based on security risks described by the security information.

Note that steps 305-340 also may be used to setup and/or maintain the catalog 215. For example, the security system 170 may receive from the admin client device 130 selections of the cloud applications for monitoring. The security system 170 may perform steps 305-340 for each of the selected cloud applications to build out the information describing the selected cloud applications in the catalog 215. In some embodiments, the security system 170 may periodically re-run steps 305-340 for each of the selected cloud applications.

Figure 4A:
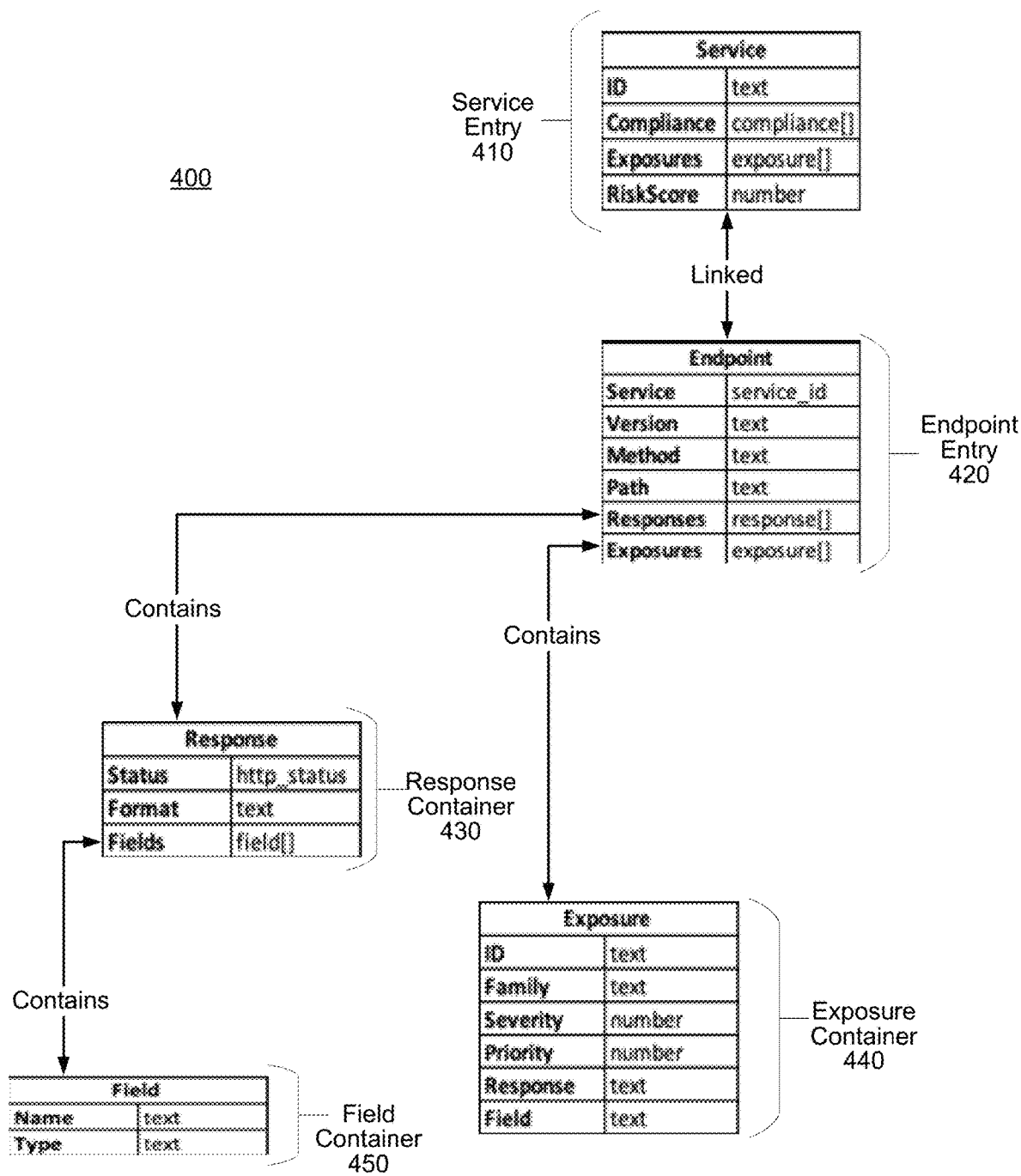
FIG. 4A illustrates an example block diagram of components of a catalog, in accordance with some embodiments.

FIG. 4A describes an example block diagram 400 of components of a catalog, in accordance with some embodiments. Alternative embodiments may include more, fewer, or different components from those illustrated in FIG. 4A, and the functionality of each component may be divided between the components differently from the description below. The catalog is an embodiment of the catalog 215. The catalog includes a service entry 410 that is linked to one or more endpoint sections (e.g., endpoint entry 420).

The service entry 410 holds information relating to a cloud application. In the illustrated embodiment, service entry 410 may store information pertaining to the following fields (or strings): ID, Compliance, Exposures, and RiskScore. Information in the ID field identifies the cloud application. It is noted that as described herein a field may be populated with data. The field may be a string (e.g., a string of data in single populated field) or there may be one or more fields in a container. Information in the Compliance field may be used to describe how an organization ensures that the API supports security and governance protocols. Information in the Exposures field describes exposures identified for the cloud application. And information in the RiskScore field describes a risk score for the cloud application. Note that as illustrated both the Compliance field and the Exposures container may each include respective container(s), however, the container(s) are not shown for simplicity. For example, a Compliance field may include data standards the service is known to be compliant with. For example, a service may be compliant with the European Standard for General Data Protection Regulation (GDPR) or Health Insurance Portability and Accountability Act (HIPAA). The Exposures container 440 corresponds to where there may be a particular exposure to an endpoint that cannot be discreetly associated with a single endpoint, e.g., belongs to endpoints combination or the API in general.

The endpoint entry 420 holds information relating to a particular endpoint associated with the cloud service. In the illustrated embodiment, the endpoint entry 420 may store information pertaining to the following fields: Service, Version, Method, Path, Responses, and Exposures. The Service field is the service ID that the endpoint is associated with. The Version field is the version of the API for that path. Some services have multiple versions of the API, so all parameters but the version are the same. The Method field describes the method used to call the endpoint. For instance, in the case of HTTP, it could be "GET" or "POST". The Path field is the path of the endpoint. For instance, in the case of HTTP, it could be "/api/v1/facts". The Responses field is a list of responses as described in the "Response" field. The Exposures field is a list of exposures as described in the "exposure" field. Exposures are usually associated with endpoints. However, it is possible for a service to have an exposure that is not associated with an endpoint. For example, a service may have a configuration that exposes a secret key in the response headers. In this case, the exposure is not associated with an endpoint, but with the service itself. Another case is for an exposure that is associated with multiple endpoints. A combination call of two endpoints may expose sensitive data. For these cases, it is possible to declare exposures at the service level. Note that the Responses field is a container that contains one or more response containers (e.g., a response container 430), and the Exposures field is a container that contains one or more exposure containers (e.g., an exposure container 440).

The response container 430 holds information relating to a particular response. In the illustrated embodiment, the response container 430 may store information pertaining to the following fields: Status, Format, and Fields. The field holds the response status or name. In the common case, when using HTTP, this holds the HTTP status code. The format field holds the format of the response content. For instance, in the case of a JSON response, the format may be "json". The fields Field includes a list of fields as described in the "field" field.

Note that the Fields field is a container that contains one or more field containers (e.g., a field container 450).

The field container 450 holds information relating to a particular field. In the illustrated embodiment, the field container 450 may store information pertaining to the following fields: Name and Type. The field name denotes the name of the Field that is exposed. For instance, in the case of a JSON response, the field name may be "email" or "ssn". The field type describes the type of the field that is exposed. For instance, in the case of a JSON response, the field type may be "string" or "integer".

The exposure container 440 holds information relating to a particular exposure. In the illustrated embodiment, the exposure container 440 may store information pertaining to the following fields: ID, Family, Severity, Priority, Response, and Field. The exposure container 440 holds information relating to a particular exposure. In the illustrated embodiment, the exposure container 440 may store information pertaining to the following fields an ID field that is a unique identifier for the exposure. The ID is used for referencing the exposure and it is a well defined identifier that describes the exposure, for instance the id "pii:emailaddress" describes an exposure of a personal identifiable information of type email address. A Family field may be a category ID of the exposure. This is the prefix of the ID that describes the category and used for grouping exposures. A Severity field and a Priority field may be the severity and priority of the exposure are used to calculate the risk of the exposure. The severity is a measure of the impact of the exposure, while the priority is a measure of the urgency of the exposure. Each one is typically populated with a value from 0 to 100. The system can support multiple risk models, so the severity and priority can be used in different ways to calculate the risk. For instance, from a GDPR perspective, the severity of "pii" family exposures is high, while for HIPPA, the most important family would be "phi" (protected health information). This means that different risk models will yield different risk scores for the same exposure. A Response field and a Field field define the specific data field within a specific response that is exposing the data. They are not mandatory and used to reduce the number of false positives. For example, for a hypertext transfer protocol (HTTP), an exposure may be defined only when the response is 200 (Status OK), the body is a JSON and it contains the provided field. In cases where the system is able to see the traffic in its entirety, it can monitor the returned "response" (for HTTP, the status codes), and the associated data, for various formats (JSON, XML, etc). If the data is visible, it is possible to analyze the data to verify the problematic field was indeed returned on that specific request. Typical values for response and fields would be "200" and "email" respectively.

Figure 4B:
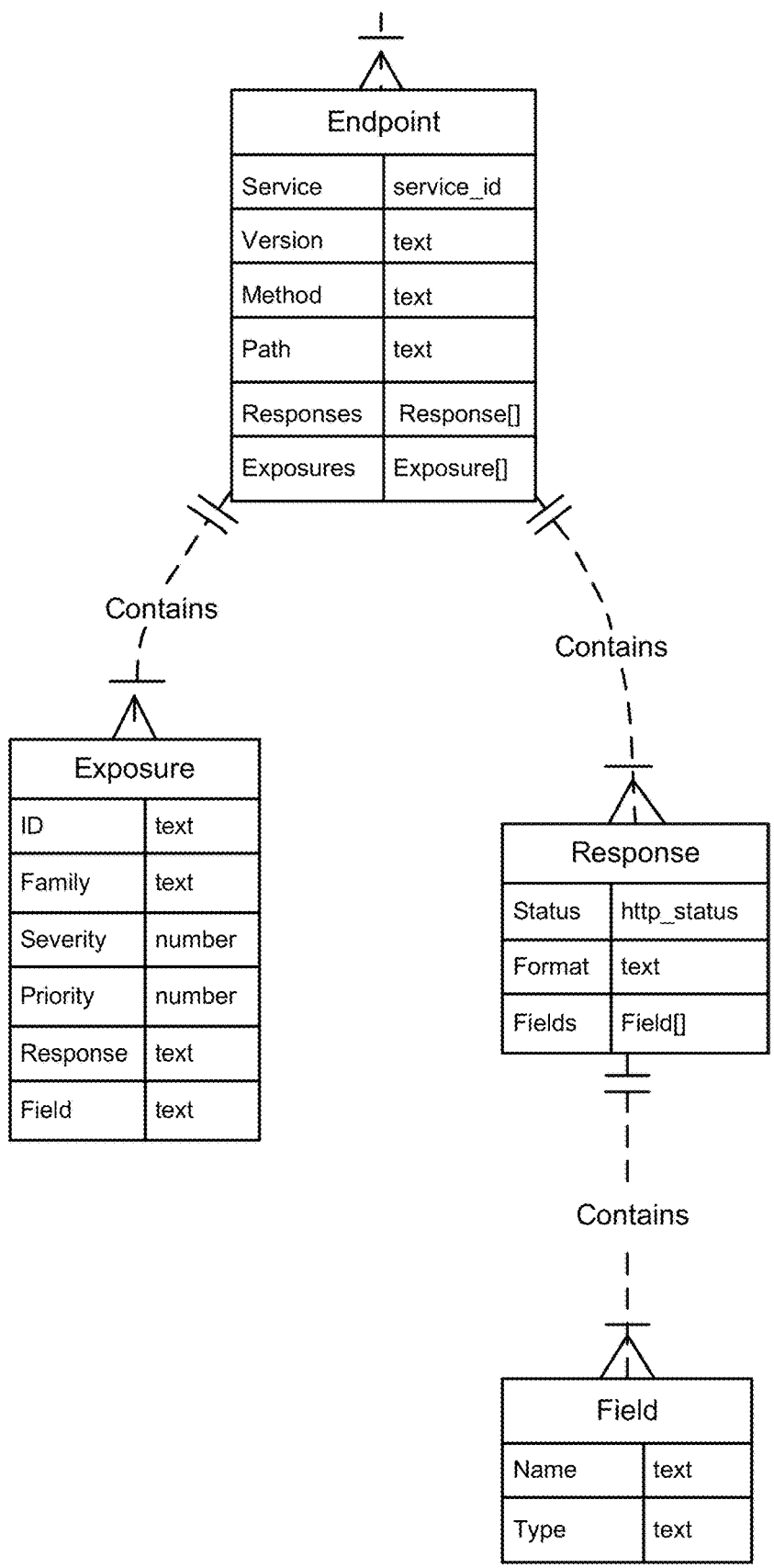
FIG. 4B illustrates an example Endpoint that contains an Exposure and Response in accordance with some embodiments.

Referring briefly to FIG. 4B, illustrated is an example of an Endpoint that contains an Exposure and Response. The Response further contains a Field. In one embodiment, this configuration obviates a need for a "request" object defined in the catalog. The "endpoint" encapsulates, and therefore defines, the risk for the request. While an endpoint can generate multiple well-defined responses, typically, there is only one valid request. It is uncommon for a single endpoint to support multiple request types. If a request has parameters it still constitutes the same request. Accordingly, the disclosed configuration has a risk profile associated both to the endpoint and one ore more responses.

FIG. 5 is a flowchart for a method 500 of dynamic reconstruction of cloud application network traffic for security monitoring, in accordance with some embodiments. Alternative embodiments may include more, fewer, or different steps from those illustrated in FIG. 5, and the steps may be performed in a different order from that illustrated in FIG. 5. These steps may be performed by a security system (e.g., the security system 170). Additionally, each of these steps may be performed automatically by the security system without human intervention.

The security system maintains 510 a catalog that includes API data associated with one or more APIs of one or more cloud applications. The one or more APIs may be used by one or more devices (e.g., devices 120) of an organization (e.g., the organization 118) to access information from one or more cloud API servers (e.g., the cloud API server(s) 110). Maintaining the catalog may include, e.g., retrieving API documentation for each of the one or more APIs from one or more sources, and converting the API documentation to API data for each of the one or more APIs. The security system may load the API data for one or more APIs into the catalog. In some embodiments, the security system may also extract exposure information, for each of the one or more APIs, from the API data. For example, the security system may analyze the API data for exposures that include sensitive information (e.g., PII). In another example, the security system may perform one or more API calls in accordance with the API documentation within a sample test instance for a cloud application of the one or more cloud applications to identify exposures associated with the one or more API calls. The security system may determine endpoints that correspond to the exposures, and update the API data with associations between the determined endpoints and the corresponding exposures.

The security system collects 520, using one or more collectors that are each specific to a different API of the one or more APIs, network information. The network information may describe communications associated with the one or more cloud applications used by the one or more devices of the organization, and the network information includes partial log data from some of the one or more collectors. The security system may establish a separate application instance for each collector of the one or more collectors. And each of the one or more collectors may perform one or more API calls to collect respective portions of the network information. The one or more collectors may periodically (e.g., hourly) collect the network information.

The security system generates 530 an enriched reconstruction of API network traffic using at least the partial log data and the catalog. The security system may generate the reconstruction by organizing requests and responses from the network information (e.g., may use the partial log data) into corresponding tables. The security system may identify matches between the requests and responses to create pairs that together form the reconstructed API network traffic. The security system enriches the reconstruction of the API network traffic by associating each pair with a respective endpoint entry in the catalog to form a connection entry. For example, the security system may query the catalog for matching endpoints based on one or more fields in the catalog. The security system may use criteria (e.g., service IDs, HTTP methods, etc.) to match with the reconstructed API network traffic to find corresponding endpoints in the catalog. The security system may then associate the endpoints with the corresponding pairs in the catalog to form the connection entries. In this manner, the security system can fill in missing details from the catalog such as the HTTP method, headers, body, etc. that were not captured in the network information. The association with the pairs in the catalog may act to enrich the reconstructed API network traffic with other security related information (e.g., exposures and/or risk scores) in the catalog. In some embodiments, the security system may also enrich the reconstructed API network traffic using information from other sources (e.g., a geo-location enricher).

The security system determines 540 security information that identifies a security risk using the reconstruction of the API network traffic. The security system may use the security related information (e.g., risk score and exposure) along with network information (e.g., traffic information) to calculate a risk factor (e.g., high risk, low risk) that is specific to each connection entry. The security system may adjust the risk factor based in part on other factors (e.g., client reputation, sensitivity of the information) associated with the corresponding connection entry.

The security system provides 550 the security information to an administrator device (e.g., the admin device 130) of the organization. In some embodiments, the security system provides the security information responsive to a request from the admin client device of the organization. In some embodiments, responsive to a risk factor associated with a security risk exceeding a threshold value, the security system may provide an alert to the admin client device (and/or some other client device associated with the administrator). The alert may include a recommendation for mitigating the security risk.

The admin client device 130 may present the security information. The administrator may take action based on security risks described by the security information.

Computing Machine Architecture

Figure 6:
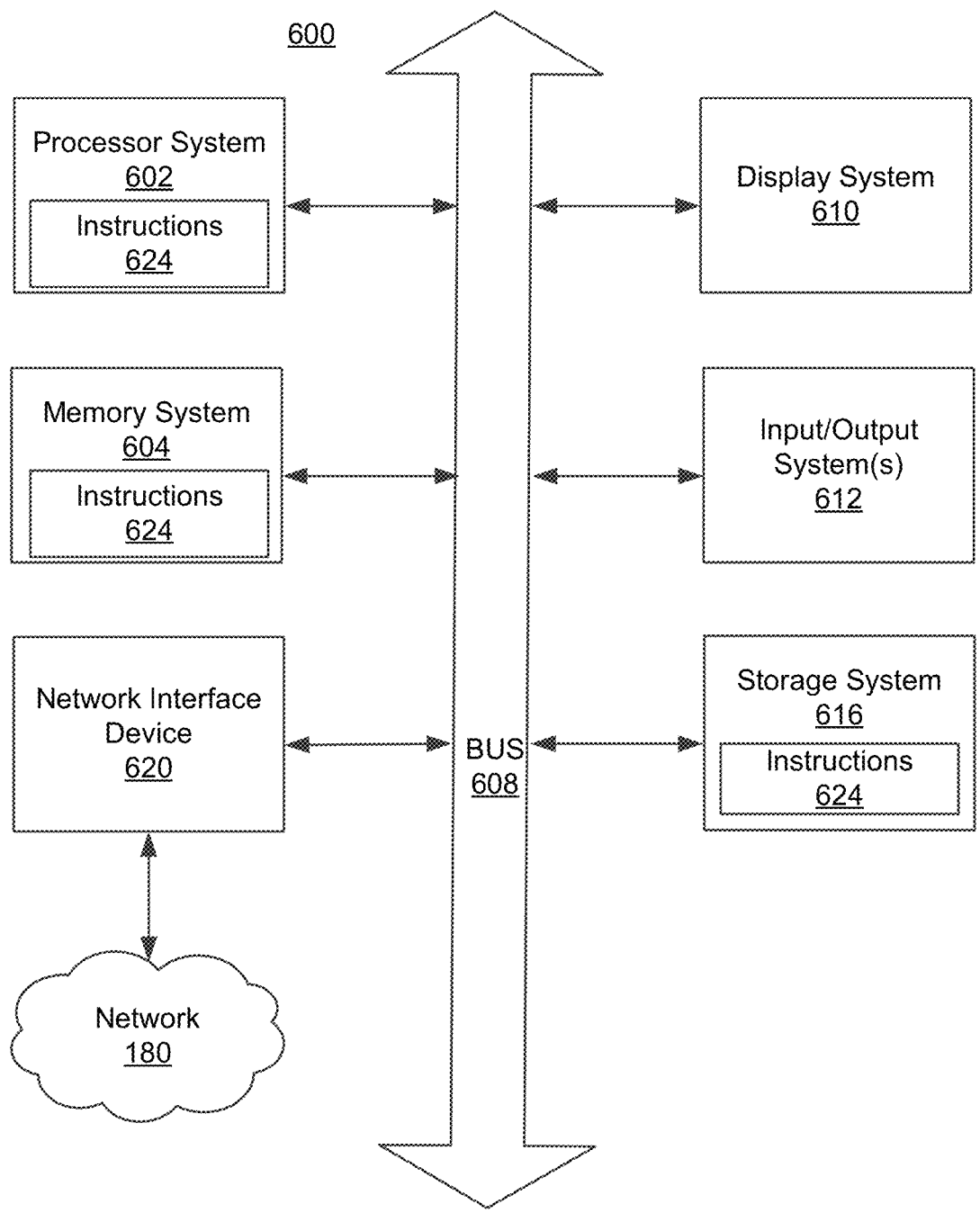
FIG. 6 is an example machine to read and execute computer readable instructions, in accordance with an embodiment.

Turning now to FIG. 6, illustrated is an example machine to read and execute computer readable instructions, in accordance with an embodiment. Specifically, FIG. 6 shows a diagrammatic representation of the security system 170, a cloud API server 110, a device 120, an admin client device 130, and/or an external system 115 in the example form of a computer system 600. The computer system 600 is structured and configured to operate through one or more other systems (or subsystems) as described herein with regard to FIGS. 1 through 5. The computer system 600 can be used to execute instructions 624 (e.g., program code or software) for causing the machine (or some or all of the components thereof) to perform any one or more of the methodologies (or processes) described herein. In executing the instructions, the computer system 600 operates in a specific manner as per the functionality described. The computer system 600 may operate as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The computer system 600 may be a server computer, a client computer, a personal computer (PC), a tablet PC, a smartphone, an internet of things (IOT) appliance, a network router, switch or bridge, or other machine capable of executing instructions 624 (sequential or otherwise) that enable actions as set forth by the instructions 624. Further, while only a single machine is illustrated, the term "machine" shall also be taken to include any collection of machines that individually or jointly execute instructions 624 to perform any one or more of the methodologies discussed herein.

The example computer system 600 includes a processor system 602. The processor system 602 includes one or more processors. The processor system 602 may include, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The processor system 602 executes an operating system for the computer system 600. The computer system 600 also includes a memory system 604. The memory system 604 may include or more memories (e.g., dynamic random access memory (RAM), static RAM, cache memory). The computer system 600 may include a storage system 616 that includes one or more machine readable storage devices (e.g., magnetic disk drive, optical disk drive, solid state memory disk drive).

The storage system 616 stores instructions 624 (e.g., software) embodying any one or more of the methodologies or functions described herein. For example, the instructions 624 may include instructions for implementing the functionalities of the security system 170. The instructions 624 may also reside, completely or at least partially, within the memory system 604 or within the processor system 602 (e.g., within a processor cache memory) during execution thereof by the computer system 600, the memory system 604 and the processor system 602 also constituting machine-readable media. The instructions 624 may be transmitted or received over the network 180, via the network interface device 620.

The storage system 616 should be taken to include a single medium or multiple media (e.g., a centralized or distributed database, or associated caches and servers communicatively coupled through the network interface device 620) able to store the instructions 624. The term "machine-readable medium" shall also be taken to include any medium that is capable of storing instructions 624 for execution by the machine and that cause the machine to perform any one or more of the methodologies disclosed herein. The term "machine-readable medium" includes, but not be limited to, data repositories in the form of solid-state memories, optical media, and magnetic media.

In addition, the computer system 600 can include a display system 610. The display system 610 may driver firmware (or code) to enable rendering on one or more visual devices, e.g., drive a plasma display panel (PDP), a liquid crystal display (LCD), or a projector. The computer system 600 also may include one or more input/output systems 612. The input/output (IO) systems 612 may include input devices (e.g., a keyboard, mouse (or trackpad), a pen (or stylus), microphone) or output devices (e.g., a speaker). The computer system 600 also may include a network interface device 620. The network interface device 620 may include one or more network devices that are configured to communicate with the network 180.

The processor system 602, the memory system 604, the storage system 616, the display system 610, the IO systems 612, and the network interface device 620 are communicatively coupled via a computing bus 608.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium and processor executable) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module is a tangible component that may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Upon reading this disclosure, those of skill in the art will appreciate still additional alternative structural and functional designs for a system and a process for dynamic reconstruction of cloud traffic for security monitoring through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method, performed in a security system comprising one or more processors and a non-transitory computer readable medium, the method comprising:
   maintaining a catalog that includes application programming interface (API) data associated with one or more application programming interfaces (APIs) of one or more cloud applications, the one or more APIs are used by one or more devices of an organization to access information from one or more cloud API servers;
   collecting, using one or more collectors that are each specific to a different API of the one or more APIs, network information describing communications associated with the one or more cloud applications used by the one or more devices of the organization and the one or more cloud API servers, the network information including partial log data from some of the one or more collectors;
   generating an enriched reconstruction of API network traffic using at least the partial log data and the catalog;
   determining security information that identifies a security risk using the enriched reconstruction of the API network traffic; and
   providing the security information to an administrator device of the organization.

2. The method of claim 1, wherein maintaining the catalog that includes the API data associated with the one or more APIs of the one or more cloud applications, comprises:
   loading the API data for the one or more APIs into the catalog; and
   extracting exposure information for each of the one or more APIs from the API data.

3. The method of claim 2, wherein loading the API data for the one or more APIs into the catalog, comprises:
   retrieving API documentation for an API of the one or more APIs; and
   converting the API documentation into a data structure used by the catalog to form a portion of the API data.

4. The method of claim 2, wherein extracting the exposure information for each of the one or more APIs using in part the API data, comprises:
   analyzing the API data for exposures;
   determining endpoints that correspond to the exposures; and
   updating the API data with associations between the determined endpoints and the corresponding exposures.

5. The method of claim 1, wherein maintaining the catalog that includes the API data associated with the one or more APIs of the one or more cloud applications, comprises:
   performing one or more API calls within a sample test instance of a cloud application of the one or more cloud applications in accordance with API documentation associated with the cloud application, to identify exposures associated with the one or more API calls;
   determining endpoints that correspond to the exposures; and
   updating the catalog with associations between the determined endpoints and the corresponding exposures.

6. The method of claim 1, wherein generating the enriched reconstruction of API network traffic using at least the partial log data and the catalog, comprises:
   organizing requests and responses from the partial log data into corresponding tables;
   identifying matches between the requests and the responses to create pairs that together form reconstructed API network traffic; and associating the created pairs with respective endpoint entries in the catalog to form connection entries that make up the enriched reconstruction of API network traffic.

7. The method of claim 6, further comprising:
using a geo-location enricher to add geo-location information for IP address for at least some of the connection entries.

8. The method of claim 1, wherein collecting, using the one or more collectors that are each specific to a different API of the one or more APIs, network information, further comprises:
establishing a separate application instance for each collector, of the one or more collectors; and
performing, by each of the one or more collectors, an API call to collect a portion of the network information.

9. A non-transitory computer readable storage medium comprising stored instructions, the instructions when executed by one or more processors of a security system cause the security system to:
maintain a catalog that includes API data associated with one or more APIs of one or more cloud applications, the one or more APIs are used by one or more devices of an organization to access information from one or more cloud API servers;
collect, using one or more collectors that are each specific to a different API of the one or more APIs, network information descriptive of communications associated with the one or more cloud applications used by the one or more devices of the organization and the one or more cloud API servers, the network information including partial log data from some of the one or more collectors;
generate an enriched reconstruction of API network traffic using at least the partial log data and the catalog;
determine security information that identifies a security risk using the enriched reconstruction of API network traffic; and
provide the security information to an administrator device of the organization.

10. The non-transitory computer readable storage medium of claim 9, wherein the instructions to maintain the catalog that includes the API data associated with the one or more APIs of the one or more cloud applications further comprises stored instruction that when executed cause the security system to:
load the API data for the one or more APIs into the catalog; and
extract exposure information for each of the one or more APIs from the API data.

11. The non-transitory computer readable storage medium of claim 10, wherein the instructions to load the API data for the one or more APIs into the catalog further comprises stored instructions that when executed cause the security system to:
retrieve API documentation for an API of the one or more APIs; and
convert the API documentation into a data structure used by the catalog to form a portion of the API data.

12. The non-transitory computer readable storage medium of claim 10, wherein the instructions to extract the exposure information for each of the one or more APIs using in part the API data further comprises stored instructions that when executed cause the security system to:
analyze the API data for exposures;
determine endpoints that correspond to the exposures; and
update the API data with associations between the determined endpoints and the corresponding exposures.

13. The non-transitory computer readable storage medium of claim 9, wherein the instructions to maintain the catalog that includes the API data associated with the one or more APIs of the one or more cloud applications further comprises stored instructions that when executed cause the security system to:
perform one or more API calls within a sample test instance of a cloud application of the one or more cloud applications in accordance with API documentation associated with the cloud application, to identify exposures associated with the one or more API calls;
determine endpoints that correspond to the exposures; and
update the catalog with associations between the determined endpoints and the corresponding exposures.

14. The non-transitory computer readable storage medium of claim 9, where the stored instructions to generate the enriched reconstruction of API network traffic using at least the partial log data and the catalog further comprises stored instructions that when executed cause the security system to:
structure requests and responses from the partial log data into corresponding tables;
identify matches between the requests and the responses to create pairs that together form reconstructed API network traffic; and
generate connection entries that make up the enriched reconstruction of API network traffic by associating the created pairs with respective endpoint entries in the catalog.

15. The non-transitory computer readable storage medium of claim 14, further comprising stored instructions that when executed cause the security system to:
enable a geo-location enricher to add geo-location information for IP address for at least some of the connection entries.

16. The non-transitory computer readable storage medium of claim 9, wherein the instructions to collect, using the one or more collectors that are each specific to a different API of the one or more APIs, network information further comprises stored instructions that when executed cause the security system to:
establish a separate application instance for each collector, of the one or more collectors; and
perform, by each of the one or more collectors, an API call to collect a portion of the network information.

17. A security system comprising:
one or more processors; and
a non-transitory computer readable storage medium coupled to the one or more processors and comprising stored instructions that, when executed by the one or more processors, cause the security system to:
maintain a catalog that includes API data associated with one or more APIs of one or more cloud applications, the one or more APIs are used by one or more devices of an organization to access information from one or more cloud API servers,
collect, using one or more collectors that are each specific to a different API of the one or more APIs, network information describing communications associated with the one or more cloud applications used by the one or more devices of the organization and the one or more cloud API servers, the network information including partial log data from some of the one or more collectors, generate an enriched reconstruction of API network traffic using at least the partial log data and the catalog, determine security information that identifies a security risk using the enriched reconstruction of API network traffic, and provide the security information to an administrator device of the organization.

18. The security system of claim 17, wherein the instructions to maintain the catalog that includes the API data associated with the one or more APIs of the one or more cloud applications further comprises stored instruction that when executed cause the security system to:

perform one or more API calls within a sample test instance of a cloud application of the one or more cloud applications in accordance with API documentation associated with the cloud application, to identify exposures associated with the one or more API calls;

determine endpoints that correspond to the exposures; and update the catalog with associations between the determined endpoints and the corresponding exposures.

19. The security system of claim 17, wherein the instructions to generate the enriched reconstruction of API network traffic using at least the partial log data and the catalog further comprises stored instruction that when executed cause the security system to:

structure requests and responses from the partial log data into corresponding tables;

identify matches between the requests and the responses to create pairs that together form reconstructed API network traffic; and generate connection entries that make up the enriched reconstruction of API network traffic by associating the created pairs with respective endpoint entries in the catalog.

20. The security system of claim 17, wherein the instructions to collect, using the one or more collectors that are each specific to a different API of the one or more APIs, network information further comprises stored instruction that when executed cause the security system to:

establish a separate application instance for each collector, of the one or more collectors; and perform, by each of the one or more collectors, an API call to collect a portion of the network information.

\* \* \* \* \*